Patented May 12, 1942

2,282,601

UNITED STATES PATENT OFFICE 2,282,601

YELLOW GLASS COMPOSITION

Henry H. Blau, Corning, N. Y., and Weston H. Gillett, Lock No. 4, Pa., assignors to Corning Glass Works, Corning, N. Y., a corporation of New York No Drawing. Application June 25, 1938, Serial No. 215,918

7 Claims. (Cl. 106—54)

This invention relates to glass and more particularly to yellow or amber tinted glass. Generally speaking, such glasses are very difficult to produce with uniformity and it has heretofore been practically impossible to obtain a satisfactory yellow or amber color which, in soft or basic glasses of the type commonly used for continuous tank production, would be insensitive to variations in melting conditions. Among the materials used for coloring prior yellow glasses are included selenium, carbon, sulfur, cadmium sulfide, iron, manganese, cerium, titanium, silver, etc. Most of these coloring agents are sensitive to oxidation and reduction. Some of them are volatile at glass melting temperatures. All of them are unsatisfactory for tank melting.

The primary object of this invention is to produce a yellow or amber tinted glass, the color of which is substantially insensitive to variations in melting and annealing conditions and which is particularly adapted for melting in continuous tank furnaces without variations in color.

Another object is to produce an ivory tinted opal glass of uniform color characteristics.

To these and other ends the invention comprises a glass containing silica, alkali oxide, zinc oxide and from about .005% to about .1% nickel oxide.

Another embodiment of the invention comprises a yellow tinted glass containing silica, alkali oxide, zinc oxide and from about .005% to about .1% of nickel oxide and containing an opacifying agent.

Nickel in glass appears to be insensitive to oxidation and reduction and is not volatile. The transmission curves of prior nickel-containing glasses, however, are in general irregular with no sharply defined transmission bands and such curves show a relatively low transmission in the yellow and relatively higher transmission in the violet and red, depending upon composition. In other words, nickel produces in ordinary glasses an indefinite color which tends toward either violet or brown. In certain glasses of highly acidic character, such as glasses free from alkali or containing large amounts of boric oxide with low alkali content, the color becomes more nearly amber. Consequently, nickel has found little use in glass except as a decolorizer and in relatively large concentrations for making black or smoke colored glasses.

We have discovered that zinc increases the transmission for yellow and lowers the transmission for blue and violet in low nickel glasses, provided the alkali content is not too high, and we have found that in a glass containing zinc oxide the introduction of a small percentage of nickel oxide, from .005% to about .1%, produces a light yellow tint which is easy to control and if the glass is opal a pleasing ivory tint is produced which is very desirable for use in the fabrication of table ware, art glass and the like. Heretofore it has been very difficult to obtain a proper ivory color for such uses and those which have been in use were subject to much uncertainty in their control, particularly when they contained fluorine. On account of the stability of their color, our new glasses are particularly suitable for tank melting.

The production of a yellow or amber tint with a small percentage of nickel depends largely upon the presence of zinc oxide in the glass. This is proved by the fact that if zinc is omitted or replaced with other constituents such as lead, lime, magnesia, baryta, etc., the color reverts to a violet or grayish coloration. Provided zinc is present in substantial amount, however, appreciable quantities of other constituents may be tolerated without undue discoloration. Preferably the zinc oxide content should not exceed about 15%, because too large an amount of zinc bleaches the yellow color and it becomes too pale. A zinc oxide content as low as 2% is effective in producing the yellow color, but much below this the color tends toward violet. Alkali oxide has an opposite effect and its content should preferably be low. Potash may be substituted wholly or in part for soda without marked influence on the color. Boric oxide in small percentages has no serious effect on the color. Large amounts tend to favor the yellow color. Alumina also may be present in amounts up to 10% or 12% without appreciable effect on the color.

The yellow or amber tint produced by nickel in accordance with our invention may also be employed with advantage to modify the color produced by other coloring oxides. For example, the color produced by uranium contains too much green for some purposes. In a zinc-containing glass the combination of small amounts of nickel and uranium in the proportions of about one to three produces a very good amber-yellow tint and when the glass contains also an opacifier the result is a beautiful ivory tint.

The following compositions, which were calculated from their respective batches, are examples of glasses made in accordance with this invention:

|  | A | B | C | D | E |
|---|---|---|---|---|---|
| SiO₂ | 60.1 | 71.5 | 68.3 | 69.1 | 59.8 |
| Na₂O | 8.8 | 14.5 | 9.5 | 5.9 | 9.2 |
| K₂O |  |  |  | 1.2 |  |
| Al₂O₃ | 9.7 | 7.0 | 3.0 |  | 10.1 |
| ZnO | 12.3 | 7.0 | 14.1 | 8.0 | 14.4 |
| CaO | 4.8 |  |  |  | 4.3 |
| PbO | 2.7 |  | 3.1 |  | 2.2 |
| B₂O₃ | 1.6 |  | 1.9 | 15.8 |  |
| NiO₂ | .014 | .052 | .015 | .04 | .012 |
| F | 6.3 | 4.9 |  |  | 5.3 |
| UO₂ |  |  |  |  | .04 |

Glasses A and B are opal zinc glasses containing nickel and having a pleasing ivory tint, B being somewhat deeper in color on account of its higher nickel content. Glasses C and D are transparent and have a pale yellow or amber color, D being a low expansion zinc borosilicate. E is a zinc opal glass containing nickel and uranium and is ivory in color.

We claim:

1. A yellow tinted glass containing silica, alkali oxide, zinc oxide and from about .005% to about .1% nickel oxide.

2. A yellow tinted glass containing silica, alkali, boric oxide, zinc oxide and from about .005% to about .1% of nickel oxide.

3. A yellow tinted glass containing silica, alkali, zinc oxide, a small amount of uranium oxide, and from about .005% to about .1% of nickel oxide.

4. An ivory colored glass containing silica, alkali oxide, zinc oxide and from about .005% to about .1% of nickel oxide and containing an opacifying agent.

5. An ivory colored glass containing silica, alkali oxide, zinc oxide, a small amount of uranium oxide, and from about .005% to about .1% of nickel oxide and containing an opacifying agent.

6. An ivory colored opal glass containing silica, alkali, zinc oxide, fluorine and from about .005% to about .1% of nickel oxide.

7. An ivory colored opal glass containing silica, alkali, zinc oxide, fluorine, a small amount of uranium oxide, and from about .005% to about .1% of nickel oxide.

HENRY H. BLAU.
WESTON H. GILLETT.